Figure 1:
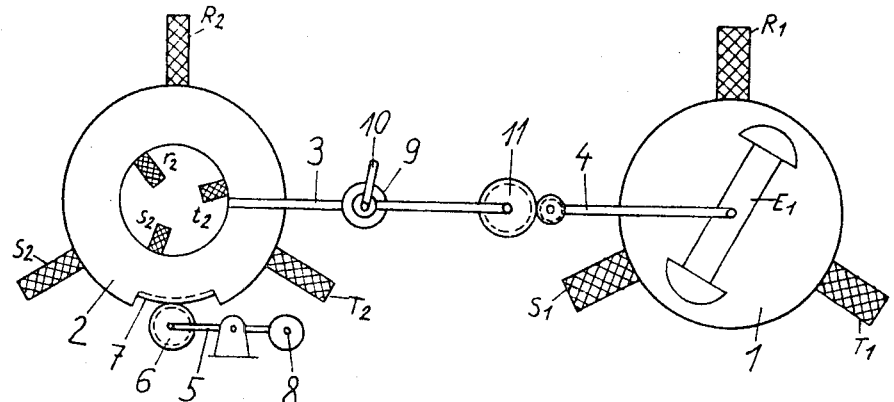

United States Patent

Stemmler

[15] 3,639,820

[45] Feb. 1, 1972

[54] CONVERTER ARRANGEMENT FOR FEEDING VARIABLE AC MOTOR

[72] Inventor: Herbert Stemmler, Nussbaumen, Switzerland

[73] Assignee: Aktiengesellschaft Brown, Boveri Cie, Baden, Switzerland

[22] Filed: Mar. 25, 1970

[21] Appl. No.: 22,530

[52] U.S. Cl. ........................... 318/147, 307/87, 310/113, 318/148, 318/231, 322/20, 322/32, 322/61
[51] Int. Cl. ............................................................ H02p 5/24
[58] Field of Search................. 318/140, 146, 147, 148, 200, 318/230, 231; 322/20, 32, 61; 307/82; 310/113

[56] References Cited

UNITED STATES PATENTS 3,141,122 7/1964 Loocke.................................318/148
3,372,323 3/1968 Guyeska..............................318/230

*Primary Examiner*—Lewis H. Myers
*Assistant Examiner*—H. Huberfeld
*Attorney*—Pierce, Scheffler & Parker

[57] ABSTRACT

A regulable and controllable inverter or converter for feeding alternating current motors with a regulated current and frequency in which adjustment of the converter output voltage per phase is effected by the voltage output of a slip ring armature-asynchronous machine driven by the motor, means being provided to rotate the winding axis of the asynchronous machine relative to that of the motor.

9 Claims, 2 Drawing Figures

PATENTED FEB 1 1972

3,639,820

Inventor
Herbert Stemmler

By Pierce, Scheffler & Parker
Attorneys

CONVERTER ARRANGEMENT FOR FEEDING VARIABLE AC MOTOR

The present invention relates to a regulable and controllable inverter or converter for feeding alternating current motors with regulation and control of the frequency and size of the load current, where the adjustment of the converter output voltage per phase is effected with at least one AC generator synchronized with the motor, this AC generator acting as an impulse generator or scanner with a device which keeps the amplitude of this output voltage constant, independent of the speed, and where multipliers of the electronic type are provided by which the amplitude and phase or frequency of the values set by the impulse generator are varied.

To this end an AC generator synchronized with the motor is used as an impulse generator. At its output is then formed a voltage which remains constant, independent of the speed, and where the amplitude and phase or frequency of this impulse generator voltage are varied by connected electronic multipliers. In a copending application Ser. No. 708,370, now U.S. Pat. No. 3,551,766 filed Feb. 26, 1968 two embodiments for the impulse generator are disclosed. On the one hand, Hall generators are used and which are installed separate from the motor or in the motor itself. Another solution consists in arranging on the rotor of the motor a ring with electrically conductive lugs which are arranged apart from each other, by a distance equal to the pole spacing of the motor, an oscillatory circuit being provided on the stator, the coil of which has an iron core with an airgap traversed by the lug.

According to the present invention a third solution is suggested which is simpler and which is characterized by the fact that a slip ring armature-asynchronous machine is used as an AC generator and includes one three-phase winding fed by a three-phase AC voltage and where a voltage supplying the impulse generator voltage is delivered by another three-phase winding, and that means are provided which turn the winding axis of the slip ring armature-asynchronous machine against the winding axis of the AC motor.

It is possible to feed to the rotor of the asynchronous machine the AC voltage and to tap from the stator the voltage supplying the impulse generator voltage or vice versa, to interchange rotor and stator.

Figure 2:
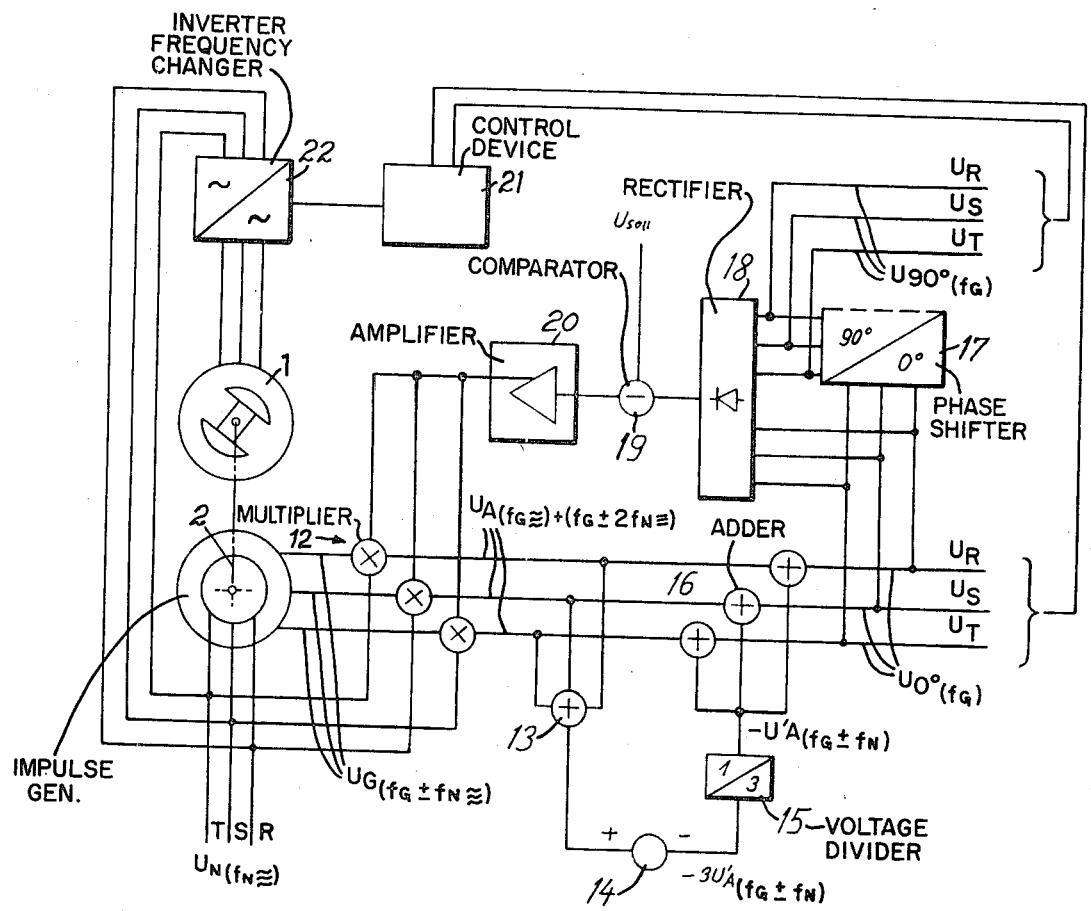

The accompanying drawings illustrate one embodiment of the invention wherein:

FIG. 1 shows the assembly of the machines and;
FIG. 2 the circuit schematically.

In FIG. 1 the motor is designated with 1. The stator windings of the motor are designated with $R_1$, $S_1$, and $T_1$. The rotor which represents the excitation of the machine with $E_1$.2 is the impulse generator which runs in synchronism with the motor. It is an asynchronous machine with the stator windings $R_2$, $S_2$, and $T_2$ and the rotor windings $r_2$, $s_2$ and $t_2$. Pulse generator 2 can be designed, for example in accordance with the arrangement described in Brown Boveri Mitteilungen, Vol. 50 No. ½ Jan., Feb., 1963, pg. 84, Fig. 123.

The connecting shafts between motor and asynchronous machine are designated with 3 and 4. Measures must now be taken which produce, apart from the synchronous run of both machines, also the phase coincidence or a certain angle to each other. In FIG. 1 two means are provided for this purpose, namely the possibility of turning the stator. This is indicated by the arrangement 5 which consists of a pinion 6 and a ring gear 7 on the stator and which can be adjusted by the handwheel 8. The adjustment can naturally also be effected by a servomotor. By operating the handwheel 8 the winding axes of the windings $R_2$, $S_2$, $T_2$ are displaced relative to windings $R_1$, $S_1$, $T_1$ of the motor. Then the phase of the voltages induced in the stator ($R_2$, $S_2$, $T_2$) and thus of the impulse generator voltage is also displaced. Another possibility is indicated in the same figure. There a clutch coupling 9 is represented which couples the shafts 3 and 4 with each other. By means of the lever 10 the coupling can be turned so that the winding axis of the rotor windings $r_2$, $s_2$, $t_2$ can be turned relative to the field winding $E_1$ of the rotor. This has the same effect as the rotation of the stator.

A gearing 11 is introduced into the coupling between shafts 3 and 4 if the number of poles of the two machines 1, 2 is unequal. In order to obtain nevertheless synchronous voltages, the speed must be transmitted in the ratio of the number of pole pairs. This effected with the gear 11.

The production of the impulse generator voltage from the voltages of the asynchronous machine 2 induced in the rotor is shown in FIG. 2. The AC voltage $U_N$ is fed to the rotor with the invariable mains frequency $f_N$. On the stator is tapped the generator voltage $U_G$ which has the frequency $f_G \pm f_N$, depending on the direction of rotation, $f_G$ being the corresponding frequency of rotation. Both voltages $U_N$ and $U_G$ are fed to the mixing elements 12, the phase sequence of the alternating voltage being interchanged, as indicated in the drawing; by multiplication a voltage $U_A$ is then formed there which contains elements with the frequency $f_G \pm 2f_N$ and the frequency $f_G$. The element with the frequency $f_G \pm 2f_N$ is in phase in all three phases, while the element with the frequency $f_G$ has a phase shift of 120° each; if one does not interchange the phase sequence of the alternating voltage $U_N$ at the input of the mixing elements, the element with the frequency $f_G \pm 2f_N$ becomes three phase, and the element with the frequency $f_G$ inphase. For the control of the motor is used substantially the first (illustrated) case. The first element is thus a zero voltage, the second a covoltage in the sense of the computation of the symmetrical components. The three phases of the voltage $U_A$ are now added in the adding element. All three-phase components, that is, the cosystems, are thus eliminated, while the inphase elements, that is, the zero systems appear with the threefold amplitude at the output. A voltage $3U_A'$ is thus produced which has the threefold amplitude of $U_A$ and which contains only the element with the frequency $f_G \pm f_N$. This voltage is turned by 180° in the reversing element 14 so that $-3U_A'$ appears. Then it is fed to a voltage divider 15 so that the voltage $-U_A'$ appears now at the output which has the same amplitude as $U_A$. The voltage divider thus transmits in a ratio of 3:1. This voltage is thus divided into three phases and fed to the adding elements 16. The latter receive in addition directly the voltage $U_A$. At the output of the adding elements 16 appear now in three phases the voltages $U_o$, which are equal to $U_A - U_A'$. Due to the addition, the elements with the frequency $f_G \pm f_N$ disappear, and only the elements with the frequency $f_G$ remain, which have in the three phases a phase displacement of 120° relative to each other. This output voltage is the desired impulse generator voltage $U_o$. The frequency $f_G$ is then the desired motor frequency.

According to the arrangement of the copending application, this output voltage is assembled with a voltage $U_{90}$ displaced by 90°. The voltage $U_{90}$ can be easily obtained with a phase shift element 17. The latter assembles in suitable manner portions of the voltage of the various phases in such a way that altogether an equal amplitude but displaced by 90° is obtained. The voltage which appears on the stator of the machine 2 is not independent of the speed. But it still exists at the speed zero of the motor. It is therefore possible to provide a voltage regulation which regulates the voltages to a constant value in both directions for all speeds from zero to the rated speed.

To this end the voltages $U_o$ and $U_{90}$ are rectified in the rectifier 18 which, as indicated in FIG. 2 consists of two three-phase bridge connections, the respective outputs of which are connected in parallel and fed to a comparator 19 where they are compared with a voltage U normal. Comparator 19 can be constructed, for example, in accordance with the circuit described in the Swedish publication "Radio and Television,—No. 12, 1968, pg. 24, FIG. 16. The difference, hence the deviation from the normal (desired) value is then amplified in the amplifier 20 and fed to the mixing elements 12 each of which functions to multiply three inputs thereto ($U_G$, $U_N$ and the output voltage from amplifier 20) to produce the output voltage $U_A$. The principle of such a multiplication circuit is described in a German publication entitled "Handbook Of Signal Operations" by K. Steinbuch, pg. 1,186, FIG. 10. The differential voltage influences by division the mixing elements in such a way that $U_A$ and thus also $U_o$ and $U_{90}$ have the same value at all speeds. The voltages $U_o$ and $U_{90}$ kept at the same amplitude are now further processed in the same way as in the arrangement according to the the copending application. They are thus fed to multipliers of the electronic type which deliver in phase and size the impulse generator voltage finally to the inverter or converter feeding the motor and can thus control the speed and the load. In this present application, the outputs $U_A$ and $U_{90°}$ are indicated in FIG. 2 as being fed to a control device 21 where they are combined to produce outputs which, in turn, control the inverter, i.e., frequency changer 22, which supplies motor 1 with power. The control device 21 and frequency changer 22 are the schematic equivalents to the corresponding arrangement shown in my aforesaid copending application, now U.S. Pat. No. 3,551,766.

I claim:

1. In a regulable and controllable inverter or converter for feeding AC motors with regulation and control of the frequency and the size of the load current, where for the adjustment of the converter output voltage per phase at least one AC generator synchronized with the motor is used as an impulse generator with a device which keeps the amplitude of this output voltage constant, independent of the speed, and wherein electronic multipliers are provided by which the amplitude and phase or frequency of the values set by the impulse generator are varied, the improvement wherein said AC generator is constituted by a slip ring armature-asynchronous machine having one three-phase winding fed by a three-phase AC voltage, and where a voltage supplying the impulse generator voltage is delivered by the other three-phase winding, and wherein means are provided which turn the winding axis of the slip ring-armature-asynchronous machine against the winding axis of AC motor.

2. Regulable and controllable inverter or converter according to claim 1, characterized in that a mixing element is connected to the stator of the asynchronous machine per phase to which is also fed the AC voltage, that an adding element is provided to which are fed the three phases of the output voltage of the mixing element, that a reversing element is connected to the adding element which is connected with a voltage divider, that another adding element is provided per phase, to which is fed the output voltage of the mixing element as well as the output voltage of the voltage divider so that the impulse generator voltage is formed at the output of this adding element.

3. Regulable and controllable inverter or converter according to claim 2, characterized in that the impulse generator voltage has a regulating device which keeps the voltage at a constant value, independent of the frequency.

4. Regulable and controllable inverter or converter according to claim 3, characterized in that a comparator is provided to which is fed the impulse generator voltage and a nominal voltage and at whose output is tapped the difference of these two voltages, and that this voltage is fed over an amplifier to the mixing elements which vary the voltage so long until the desired voltage is formed.

5. Regulable and controllable inverter or converter according to claim 1, characterized in that a stator adjusting device is arranged on the asynchronous generator which turns the winding axis of the stator against the winding axis of the stator of the motor.

6. Regulable and controllable inverter or converter according to claim 1, characterized in that the shaft of the asynchronous motor is connected with the shaft of the motor over an adjustable clutch, so that the axis of the rotor winding of the asynchronous generator can be adjusted relative to the axis of the rotor winding of the motor.

7. Regulable and controllable inverter or converter according to claim 1, characterized in that the shaft of the asynchronous generator and the shaft of the motor are connected with each other over a gear whose transmission balances different number of pairs of poles of both machines.

8. Regulable and controllable inverter or converter according to claim 1, characterized in that in order to obtain a portion of the impulse generator voltage displaced by 90°, a phase shift element is connected to the voltage supplied by the asynchronous machine.

9. Regulable and controllable inverter or converter according to claims 3 and 8, characterized in that the impulse generator voltage and the voltage displaced by 90° are rectified in order to determine the control quantity.

* * * * *